United States Patent [19]

Mueller

[11] 4,229,241
[45] Oct. 21, 1980

[54] PROCESS FOR MAKING A MULTI LAYER POLYOLEFIN SHRINK FILM

[75] Inventor: Walter B. Mueller, Taylors, S.C.

[73] Assignee: W. R. Grace & Co., Duncan, S.C.

[21] Appl. No.: 966,437

[22] Filed: Dec. 4, 1978

Related U.S. Application Data

[62] Division of Ser. No. 896,963, Apr. 17, 1978.

[51] Int. Cl.² ............... B29D 7/09; B29D 23/04
[52] U.S. Cl. .................. 156/243; 156/244.11; 156/244.14; 426/127; 428/213; 428/516; 428/518; 428/910
[58] Field of Search .......... 156/243, 244.11, 244.12, 156/244.13, 244.14; 426/127; 428/213, 412, 516, 518, 520, 910

[56] References Cited

U.S. PATENT DOCUMENTS

| | | | |
|---|---|---|---|
| 3,524,795 | 8/1970 | Peterson | 156/244.11 |
| 3,832,270 | 8/1974 | Schirmer | 156/244.14 |
| 4,055,672 | 10/1977 | Hirsch et al. | 426/127 |
| 4,058,647 | 11/1977 | Iroue et al. | 426/127 |
| 4,082,854 | 4/1978 | Yamada et al. | 426/127 |
| 4,082,877 | 4/1978 | Shadle | 156/244.14 |
| 4,169,910 | 10/1979 | Graboski | 156/243 |

FOREIGN PATENT DOCUMENTS 913289  12/1962  United Kingdom ............ 156/244.11

Primary Examiner—Caleb Weston
Attorney, Agent, or Firm—John J. Toney; William D. Lee, Jr.; John B. Hardaway

[57] ABSTRACT

The multi-layer polyolefin shrink film of this invention provides shrink tensions, optical clarity, cuttability, sealability, shrink temperature range, and tear resistance heretofore unobtainable in an oriented, monolayer polyolefin material. The preferred film has three layers in which the core layer comprises a blend of ethylene-vinyl acetate copolymer with ethylene-butylene copolymer and each skin layer comprises ethylene-propylene copolymer.

5 Claims, 3 Drawing Figures

PROCESS FOR MAKING A MULTI LAYER POLYOLEFIN SHRINK FILM

This is a division, of application Ser. No. 896,963, filed Apr. 17, 1978.

FIELD OF THE INVENTION

This invention relates to heat shrinkable, thermoplastic packaging films; and in particular, this invention relates to a multi-layer, polyolefin shrink film.

BACKGROUND OF THE INVENTION

The polyolefins and polyvinyl chlorides can be considered to be the two major families of plastic resins from which the bulk of commercially available shrink films for wrapping purposes are made. Other resin families from which shrink films can be made include the ionomers, polyesters, polystyrenes, and polyvinylidene chlorides. The shrinkable polyolefins currently on the market are mainly monolayer films which include both cross-linked and uncross-linked oriented polyethylene, oriented polypropylene, and oriented ethylene-propylene copolymers. The polyvinyl chloride (hereinafter "PVC") shrink films are monolayer films consisting of a variety of formulations of polyvinyl chloride.

A shrink film's distinguishing characteristic is its ability upon exposure to some level of heat to shrink or, if restrained, to create shrink tension within the film. This ability is activated by the packager when the wrapped product is passed through a hot air or hot water shrink tunnel. This process causes the film to shrink around the product producing a tight, transparent wrapping that conforms to the contour of the product and which is aesthetically pleasing while providing the useful functions required of packaging materials such as protection of the product from loss of components, pilferage, or damage due to handling and shipment. Typical items wrapped in PVC or polyolefin shrink films are toys, games, sporting goods, stationery, greeting cards, hardware and household products, office supplies and forms, foods, phonograph records, and industrial parts.

The manufacture of shrink films requires sophisticated equipment including extrusion lines with "racking" capability, irradiation units when cross-linking is desired, tenter frames, mechanical centerfolders, and slitters. "Racking" or "tenter framing" are orientation processes which cause the material to be stretched in the cross or transverse direction and in the longitudinal or machine direction. The films are usually heated to their orientation temperature range which varies with the different polymers but is usually above room temperature and below the polymer's melting temperature. After being stretched, the film is rapidly cooled to quench it thus freezing the molecules of the film in their oriented state. Upon heating, the orientation stresses are relaxed and the film will begin to shrink back to its original, unoriented dimension.

The PVC and polyolefin families of shrink films provide a wide range of physical and performance characteristics such as shrink force (the amount of force that a film exerts per unit area of its cross-section during shrinkage), the degree of free shrink (the reduction in surface area a material undergoes when unrestrained), tensile strength (the highest force that can be applied to a unit area of film before it begins to tear apart), sealability, shrink temperature curve (the relationship of shrink to temperature), tear initiation and resistance (the force at which a film will begin to tear and continue to tear), optics (gloss, haze and transparency of material), and dimensional stability (the ability of the film to retain its original dimensions under all types of storage conditions). Film characteristics play an important role in the selection of a particular film and may differ for each type of packaging application and for each packager. Consideration must be given to the product's size, weight, shape, rigidity, number of product components, other packaging materials which may be used along with the film and the type of packaging equipment available.

Polyolefins have been most successful with applications where moderate to high shrink tensions are preferred; and, on new, automatic, high speed shrink wrapping equipment where shrink and sealing temperature ranges are more clearly controlled. The polyolefins tend to be cleaner leaving fewer deposits and less residue thereby extending the life of the equipment and reducing equipment maintenance. The PVC films generally have better optics, lower shrink tensions, and will seal and shrink over much broader temperature ranges than the polyolefins. Polyolefins usually do not emit gases upon sealing and, in this respect, are also cleaner than PVC films.

Heretofore, polyolefins have not been able to penetrate PVC film packaging applications where the products to be packaged require the lower shrink tensions of the PVC film because the products are too fragile for use with polyolefins which possess shrink tensions up to four times those of the PVC films. PVC film is also the shrink film of choice for older, manually operated sealers and semi-automatic wrappers where temperatures are highly variable. Older, poorly maintained wrapping equipment of any type usually runs PVC better than present monolayer polyolefins due to the combination of the generally broader shrink and sealing temperature ranges of the PVC films. In addition, products with sharp or pointed extensions will often require PVC due to the high initial tear resistance of the PVC film relative to that of the polyolefins, i.e. it takes about 7 grams of force to propagate a tear in PVC whereas only 2 to 3.5 grams of force are necessary to propagate a tear in a typical monolayer polyolefin shrink film.

Accordingly, it is a general object of the present invention to provide a shrink polyolefin film that will have many of the desirable qualities of PVC films and does overcome many of PVC's limitations.

Specifically, it is an object of the present invention to provide a polyolefin film having shrink tensions approximating those of PVC films and also providing good optical qualities, a wide shrink temperature range, sealability, and resistance to tear propagation.

In addition, it is an object of the present invention to provide a polyolefin film which has none of the undesirable qualities of PVC films such as noxious odors and corrosive by-products.

Furthermore, it is an object of this invention to produce a multi-layer film having very thin layers of oriented propylene homopolymers or copolymers.

These and other objects are achieved by the multilayer polyolefin shrink film which is disclosed herein.

SUMMARY OF THE INVENTION

It has been surprisingly discovered that a flexible thermoplastic packaging film having a combination of shrink tension, optical clarity, cuttability, sealability, shrink temperature range, and tear resistance heretofore unobtainable in a monolayer polyolefin film is achieved by the multi-layer, flexible, thermoplastic, packaging film of the present invention. This multi-layer film has a "core" layer that comprises a polymeric blend, the major constituent of the blend being either a homopolymer or copolymer of ethylene and a minor constituent being either a homopolymer or copolymer of butylene; and, an "auxiliary" or "skin" layer, each auxiliary layer comprising either a homopolymer or copolymer of propylene. Preferably, the multi-layer film is oriented so that it is heat shrinkable in at least one direction. It is also preferred that the auxiliary layers be formed from the same or similar polymer and be of approximately the same thickness.

The multi-layer film may be combined with other polymeric layers for specific applications. For instance, relatively thin layers may be added on either or both sides of the basic three layer structure to improve seal strength or to lower gas and moisture premeability.

Preferred polymers for the major constituent are low density polyethylene and ethylene vinyl acetate copolymer in proportions of 70% to 90% by weight of the total blend, and preferred polymers for the minor constituent are polybutylene and ethylene-butylene copolymer in proportion of 30% to 10% by weight of the total blend.

In another aspect, the present invention is a process for making a multi-layer, flexible, thermoplastic packaging film comprising the steps of blending a major amount of polymer selected from the group consisting of homopolymers and copolymers of ethylene and of propylene with a minor amount of a polymer selected from the group consisting of butylene homopolymers and copolymers to form a core layer blend; providing an auxiliary layer composition comprising a polymer selected from the group consisting of propylene homopolymers and copolymers; coextruding said core layer blend between two auxiliary layers to form a multi-layer film; and, stretching said multi-layer film to biaxially orient same.

In yet another aspect, the present invention is a process for orienting thin films of propylene polymers and copolymers by coextruding said thin films with an unoriented polymeric layer therebetween.

DEFINITIONS

Unless specifically set forth and defined or limited, the term "polymer" as used herein generally includes homopolymers, copolymers, terpolymers, block, graft polymers, random, and alternating polymers.

The term "melt flow" as used herein or "melt flow index" is the amount, in grams, of a thermoplastic resin which can be forced through a given orifice under a specified pressure and temperature within 10 minutes as described in ASTM D 1238.

The term "oriented" or "orientation" as used herein means the alignment of the molecules of a polymer predominately in a particlar direction. "Orientation" is used interchangeably with "heat shrinkability" herein and designates a material which has been stretched and set at its stretched dimensions and which will tend to return to its original dimensions when heated to a specific temperature below its melting temperature range.

The term "core" or "core layer" as used herein means a layer in a multi-layer film which is enclosed on both sides by additional or auxiliary layers. The core may be either "hot blown" or "oriented."

The term "hot blown" as used herein means that the material referred to has been stretched at or above its melting temperature range so that the stretching has induced a minimum of stresses and molecular orientation. Such a material is not considered to be "heat shrinkable" as it will have very low shrink tension.

"Auxiliary" layers herein refer to layers in a multi-layer film which aid in or contribute to the shrink properties of the film.

"Skin" layers are outer layers and may also be "auxiliary" layers.

The term "polybutylene" refers to high molecular weight isotactic polymers synthesized from butene-1 monomer. They are flexible, crystalline thermoplastic polyolefins having a density of about 0.91. They are to be distinguished from polymers of isobutene (normally termed polybutene) which are widely used as oil additives, and from amorphous atatic poly (1-butene) polymers, which range from viscous oils to rubbery polymers. "Polybutylene" is composed of linear chain molecules having a regular and spatially ordered arrangement of ethyl side groups along the chain backbone. It adopts to helical conformation in the stable crystalline form and is normally 50 to 55% crystalline. Polybutylene is termed the "newest member of the polyolefin family" and can be made into film, pipe and molded articles. (See "Modern Plastics Encyclopedia 1977–1978," page 48.)

PRIOR ART STATEMENT

Closely related patents from the prior art are listed and discussed briefly in the paragraphs which follow.

(1) U.S. Pat. No. 3,097,150 issued on July 9, 1963 to William C. Rainer et al and discloses a cross-linked copolymer prepared by irradiating a mixture of normally solid polyethylene and a hydro-carbon polymer containing a plurality of isobutylene units.

(2) U.S. Pat. No. 3,176,051 issued on March 30, 1965 to Razmic S. Gregorian et al discloses a blended polyethylene composition formed by blending a major portion of a parent polymer of polyethylene having a density of 0.94 to 0.97 and a melt index in the range of 1.0 to 10 with a minor amount between 0.1 to 10% by weight of an additive consisting essentially of a member of the group consisting of polyethylene having a reduced viscosity of at least 2.9 and a copolymer of 1-butene and ethylene having a reduced viscosity of 4.0 with the result that the polyethylene composition has greatly improved clarity.

(3) U.S. Pat. No. 3,176,052 issued on March 30, 1965 to Warner L. Peticolas discloses blends of polyethylene and ethylene copolymers which are fabricated into film. The blend comprises 5 to 75% by weight of polyethylene having a density of 0.91 to 0.94 blended with 95% to 25% with a copolymer of ethylene and butene-1 which has a melt index of 0.1 to 10 and a density above 0.92.

(4) U.S. Pat. No. 3,381,717 issued on May 7, 1968 to Fredrick S. Tyrrel and discloses a blown polypropylene tubular film wherein the core or center layer comprises an ethylene vinyl acetate copolymer and the outer layers constitute a block copolymer of propylene and butylene. U.S. Pat. No. 3,595,735 which issued on July 27, 1971 also to Fredrick S. Tyrrel discloses a similar multi-layer structure but the outer layers constitute linear polyethylene.

(5) U.S. Pat. No. 3,694,524 issued on Sept. 26, 1972 to Harold G. Tinger et al and discloses blends of low density polyethylene and butene/ethylene copolymers and high tear strength blown films made therefrom. The blends have 5 to 15 weight percent low density polyethylene and 85 to 95% of a butene-1/ethylene copolymer which contains 0.25 to 3 mole percent ethylene.

(6) U.S. Pat. No. 3,817,821 which issued on June 18, 1974 to J. B. Gallini shows a three layer laminar, sealable, packaging film wherein the first layer is a blend of ethylene vinyl acetate copolymer with a second ethylene vinyl acetate copolymer or polybutene-1; the next or core layer consists of high density polyethylene; and the third layer is a blend of high density polyethylene and ethylene vinyl acetate copolymers.

(7) U.S. Pat. No. 3,821,182 issued on June 28, 1974 to William G. Baird, Jr. and discloses a method of extruding a three ply material from a die wherein saran is the center layer and the outer layers are polyethylene. This three ply material may be irradiated, biaxially oriented, and then the outer polyethylene layers stripped away to provide a saran film with a smooth surface.

(8) Japanese patent application Ser. No. 093,603, filed August 14, 1974 and published on Jan. 5, 1978 in the name of Gunze, Ltd. discloses a film made from a mixture of ethylene-propylene copolymer, 5 to 20% wt. of a copolymer consisting of isobutylene and containing n-butene; and 0.5 to 10% wt. of an ethylene-alpha-olefin copolymer.

(9) In tables entitled "Properties of specialty films" and "Shrink and stretch film properties" on pages 37 and 39 of *Modern Packaging Encyclopedia, December 1977* a coextruded ethylene-vinyl acetate/polypropylene laminate and a coextruded polyethylene/polypropylene/low density polyethylene/polypropylene/low density polyethylene laminate is disclosed as having been stretched but as having no heat shrinking characteristics. Shrink characteristics of monolayer polyolefins such as polyethylene, polypropylene, and ethylene-vinyl acetate copolymer are listed as well as the properties of polyvinyl chloride.

(10) On page 7 of European Plastics News for December 1977 an article entitled "Witco Polybutylene for Shell" states that Witco Chemical is the only world producer of polybutylene resins and that Shell Chemical is buying Witco's polybutylene plant which plant will use butene-1 as its feedstock.

DESCRIPTION OF THE DRAWINGS

Attached hereto and made a part of this disclosure are the drawings in which.

PREFERRED EMBODIMENT

(A) Product

Figure 3:
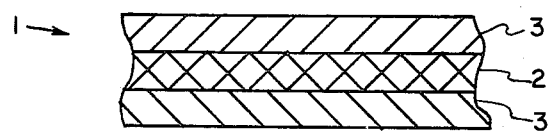

Referring to FIG. 3, the preferred embodiment of the subject invention is a three layer, coextruded polyolefin packaging film 1 having a core layer 2 and skin or auxiliary layers 3. The preferred core layer comprises a blend of approximately 80% by weight of ethylenevinyl acetate copolymer (hereinafter designated "EVA") having approximately 12% by weight vinyl acetate content and a melt flow of about 0.25 with about 20% by weight of an ethylene-butylene copolymer having up to 5% by weight of ethylene and a melt flow of about 2.0. The preferred blend proportion range is 70% to 90% wt. EVA with 30% to 10% wt. of polybutylene or ethylene-butylene copolymer. The vinyl acetate content in the EVA may vary from 8% to 20% wt. with a preferred melt flow of less than 1.0 although melt flows up to 5.0 are usable within the scope of the invention. Melt flow is considered a more important parameter than vinyl acetate content as it is thought to be a significant contributing factor in handling and machinability of the final multi-layer film. The melt flow of the ethylene-butylene copolymer or polybutylene preferably ranges from about 1.0 to 3.0.

The skin layers 3 are preferably of identical composition, each comprising ethylene-propylene copolymer wherein the ethylene content is 3.5 to 4.0% by weight and the melt flow is in the range from about 1.0 to 4.0. Polypropylene may also be used as the skin or auxiliary layer material.

The thickness of the core layer comprises 50 to 80% of the thickness of the total multi-layer structure and the combined thickness of the two skin layers comprises 20 to 50% of the total structure. The preferred total thickness of the multi-layer film is in the range of 0.5 to 1.5 mils (0.0127 mm to 0.0381 mm) with the layer thickness ratios preferably being 1/2/1, 1/3/1/, 1/4/1, etc. up to 1/8/1. A "balanced" film is produced where the auxiliary layers have the same composition and thickness, but thickness and composition may be varied within the scope of this invention.

Figure 1:
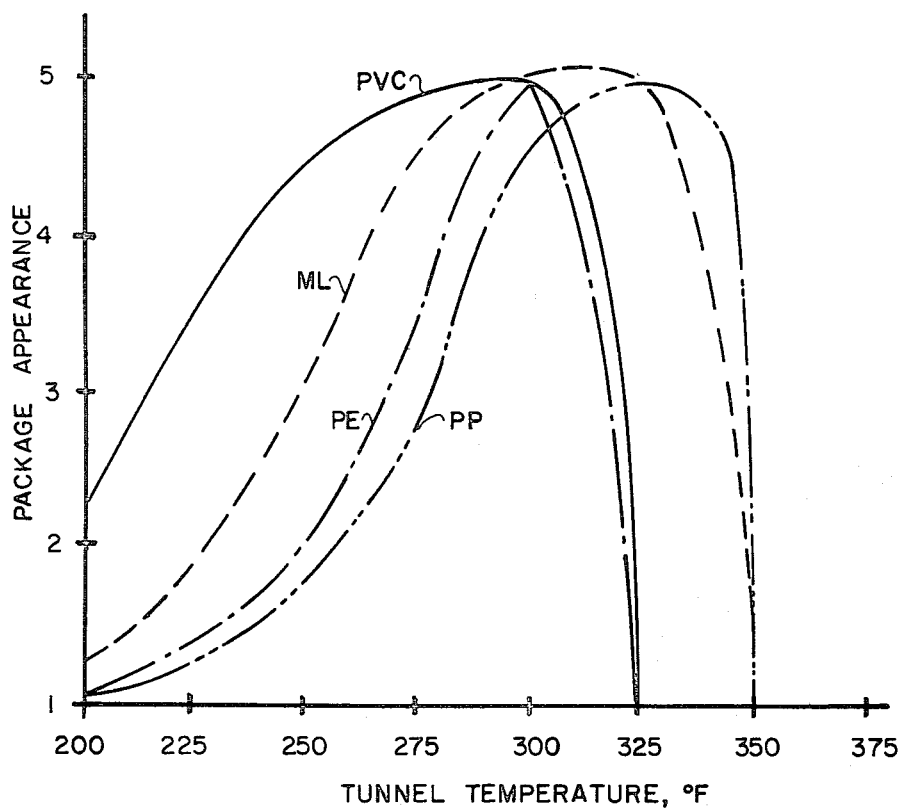
FIG. 1 is a graph of package appearance versus shrink tunnel temperature for packages wrapped in various shrink films.
Figure 2:
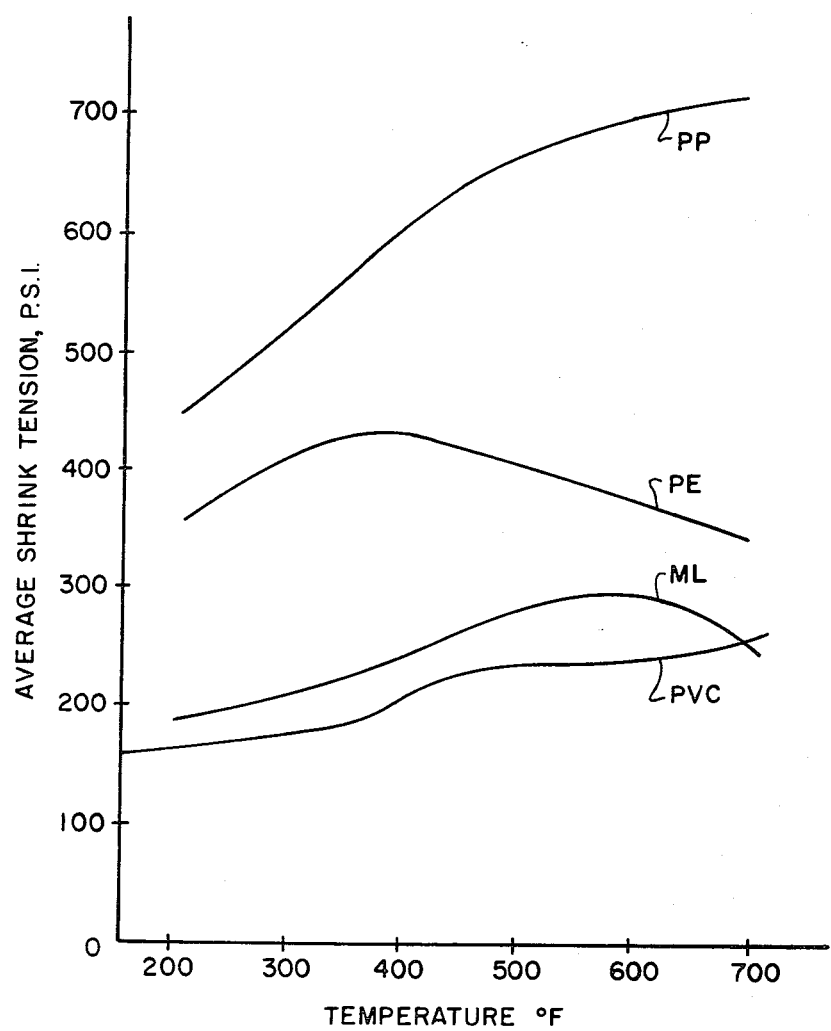
FIG. 2 is a graph of shrink tension versus temperature for four shrinkable wrapping materials; and, FIG. 3 is a schematic representation of a cross section of the multi-layer film according to the present invention.

Looking now at FIGS. 1 and 2, the unexpected attributes of the multi-layer polyolefin shrink film of the present invention become readily apparent. In FIG. 1, for instance, curves of package appearance versus tunnel temperature are plotted. The package appearance is a subjective evaluation on a scale of 1–5 and is evaluated by the same packaging expert for all the curves in FIG. 1. The factors which enter into the evaluation are smoothness of the shrunken film and absence of wrinkles, gloss and haze, seal integrity, and tendency to "dog ear" at corners and other areas of the package where shrinkage is not uniform. The tunnel temperature is the temperature of the hot air within the shrink tunnel that the wrapped packages pass through after having been wrapped and sealed. The curves are designated "PVC" for polyvinyl chloride monolayer film, specifically "Reynolon 4155" sold by Reynolds Metals Company; "ML" for the multi-layer film of the present invention with a 1/4/1 thickness ratio, "PE" for monolayer, cross-linked polyethylene, specifically "D-Film ®" sold by the Cryovac Division of W. R. Grace & Co., and "PP" for monolayer oriented polypropylene which, in this instance, is actually an ethylene-propylene copolymer which is predominately polypropylene sold as "CP-900" by the Cryovac Division of W. R. Grace & Co. In this test, a gift box was packaged using an "L" type sealer. At 25° F. (14° C.) temperature intervals from 225° F. (95° C.) to 375° F. (190° C.) wrapped packages were shrunk in a hot air tunnel, an initial low temperature run at 215° F. (102° C.) having been made. (The curves are extrapolated from 215° F. to 200° F. in FIG. 1.) On the grading scale for the shrunken packages, 5 was considered excellent and 3.0 and above was considered commercially acceptable. As can be seen from FIG. 1 each of the films has a shrink temperature at which it makes an excellent package. The PVC film has a range of about 110° F. (61° C.) during which its appearance is rated 3.0 or better. Likewise, the multi-layer film of the present invention has an acceptable range of from about 250° F. (120° C.) to about 340° F. (172° C.), approximately 90° F. (50° C.), during which its appearance is rated 3.0 or better. On the other hand, the polyethylene shrink film has a sharp peak in its appearance quality and its range above an appearance of 3.0 is roughly from 275° F. (134° C.) to 325° F. (162° C.) which is a band of only 50° F. (280° C.). Likewise, the polypropylene film has an appearance evaluation exceeding 3.0 from roughly 280° F. (137° C.) to 350° F. (176° C.) or about 70° F. (40° C.). Significantly, the multi-layer film of the present invention has a broader range of acceptable package appearance, and its acceptable range extends to lower temperatures than the monolayer polyolefin films.

FIG. 2 is a graph of average shrink tension in pounds per square inch versus the temperature in degrees Fahrenheit. Shrink tension is determined according to ASTM D 2833. The very high shrink tension of polypropylene is clearly shown as is also the relatively high shrink tension of the cross-linked polyethylene film. Of significance is the close approximation of the shrink tension of the multi-layer film of the present invention and that of PVC. The moderate shrink tension of the film of the present invention is very desirable in a number of packaging applications so that the packaged product is not distorted under the force of the shrinking film.

The data for the multi-layer shrink film of the present invention shown in the graphs of FIGS. 1 and 2 were taken from the preferred embodiment having a core layer of 80% ethylene vinyl acetate and 20% ethylene-butylene copolymer. The EVA had 12% vinyl acetate and is "Alathon 3135" brand sold by du Pont having a melt flow of about 0.25. The ethylene-butylene copolymer is "Witron 8240-2" brand sold by Witco Chemical Corporation having about 2% ethylene by weight and a melt index of about 1.0. While the 80/20 blend ratio for the core layer gives the most desirable properties, acceptable properties are generally found in core blends where the major portion of the blend is ethylenevinyl acetate copolymer and the minor portion of the blend is ethylenebutylene copolymer or polybutylene. As stated above, the range where the most desirable properties are found is from 70% to 90% by weight ethylene vinyl acetate with 30% to 10% by weight ethylene-butylene copolymer or polybutylene.

The skin or auxiliary layer material for the "ML" film in FIGS. 1 and 2 was ethylene-propylene copolymer "W07-1" sold by ARCO Polymers, Inc. having a melt flow index of approximately 4.0 to 5.0 and 3.5% to 4.0% ethylene content.

Additional layers or coatings can be added to the basic three layer structure of the present invention as desired but care must be taken not to alter the desirable shrink tensions and shrink properties of the multi-layer film of this invention.

(B) Process

In the preferred process for making the multi-layer, polyolefin shrink film of the present invention the basic steps are blending the polymers for the layers, coextruding the layers to form a multilayer film, and then stretching the film to biaxially orient it. These steps and additional desirable steps will be explained in detail in the paragraphs which follow.

The process begins by blending the raw materials or polymeric resins in the proportions desired, namely for the core layer a major portion of ethylene-vinyl acetate copolymer is blended with a minor portion of ethylene-butylene copolymer. The resin is usually purchased from a supplier in pelletized form and can be blended in any one of a number of commercially available blenders as are well known in the art. In the blending process any additives necessary for special properties may be added such as plasticizers, slip agents, anti-block agents, or anti-static compound.

The blended resins are fed into the hoppers of extruders which feed coextrusion dies. For the three layer film, three extruders are employed to feed the coextrusion die. Two extruders are fed ethylenepropylene copolymer for the two outer skin or auxiliary layers and the other extruder is fed the blend of ethylene-vinyl acetate copolymer with ethylene-butylene copolymer. Preferably the materials are coextruded as concentric tubing having a diameter which is dependent on the racking ratio and desired final diameter. This coextruded tube is relatively thick and is referred to as the "tape." Circular coextrusion dies are well known in the art and can be purchased from a number of manufacturers. In addition to tubular coextrusion, slot dies could be used to coextrude the material in sheet form; or, single or multi-layer extrusion coating could be employed.

An alternate step is to irradiate the tape or unexpanded tubing or sheet by bombarding it with high energy electrons from an accelerator to cross-link the materials in the tape. Cross-linking roughly quadruples the tensile strength of the film or the force at which the material can be stretched before tearing apart when the film materials are predominately ethylene such as polyethylene or ethylenevinyl acetate. Irradiation also improves the optical properties of the film and changes the properties of the film at higher temperatures. The preferred irradiation dosage level is in the range of 0.5 MR to 12.0 MR. In some instances it may be desirable to stretch the multi-layer film first then irradiate it; or, if sequential coating is employed one layer or a group of layers could be irradiated and then another layer or layers could be added before the final step of stretching and orienting.

Following coextrusion and irradiation, if desired, the extruded tape is heated and is continuously inflated by air pressure into a bubble thereby transforming the narrow tape with thick walls into wide tubing with thin walls of the desired film thickness. This process is sometimes referred to as the "trapped bubble technique" of orientation or as "racking." After stretching, the bubble is then deflated and the film is wound onto semi-finished rolls called "mill rolls." The racking process orients the film, stretching it transversely and longitudinally thereby rearranging the molecules, to impart shrink capabilities to the film and to modify physical characteristics. In the present invention the racking temperature is above the melting temperature of the core or center layer which is comprised of the blend of ethylene-vinyl acetate copolymer and ethylene-butylene copolymer as the oriented layers are the ethylene-butylene copolymer layers which form the skin layers. Thus, in the racking process the core layer is hot stretched or hot blown and the skin layers are biaxially oriented. It is believed that the hot blown core layer provides a moderating or damping effect on the rather strong shrink properties of the ethylene-propylene layers. In addition, by this process propylene or ethylene-propylene copolymer layers that are very thin are oriented which is a novel aspect of the present invention. In other words, another aspect of the present invention is that it is a process for producing thin, oriented, propylene homopolymer or copolymer layers by sandwiching a hot blown layer comprising a blend of EVA and butylene polymer between the propylene polymer layers and then stretch orienting the composite. Also as an aspect of this invention is the product of the foregoing process which is a film having a very thin oriented polypropylene layer. The thickness of such a layer is in the range of 0.05 mil to 0.38 mil.

In an attempt to produce a thin, monolayer, polyolefin shrink film by racking or stretch orienting, a test procedure involving a "hat tester" was used. In using a "hat tester" to produce oriented, shrink film a heated sample of the film is placed over an orifice and differential air pressure is applied to stretch the film into the orifice. The variables available in the procedure are the temperature of the film, the pressure differential, and the rate of of applying the pressure differential. A temperature level of 216° F. (102° C.) was selected as the orientation temperature because a low temperature was desired to prevent self-welding of core layer and because the 216° F. level was as low as the multi-layer film could be oriented.

First, a monolayer film, three mils thick, of the ethylenepropylene copolymer was heated to 216° F. and pressure differentials were applied at pressure differential steps of 1.0 p.s.i. between 1.4 and 8.4 p.s.i. The rate of applying the differential pressure was varied by achieving full pressure in discrete time intervals from 0.6 sec. to 5.4 sec. in increments of 0.6 sec. This film could not be stretched without rupturing it even when only 1.4 p.s.i. was applied in 1.8 sec.

The 3 mil ethylene propylene copolymer film sample which could not be oriented was the same material used in the skin layers of the preferred embodiment of the multi-layer film described above. Next, a 12 mil thick film comprising the ethylene-vinyl acetate/ethylene-butylene copolymer blend of the core layer of the preferred embodiment was subjected to stretching at the 216° F. temperature level. Again, applying pressure differential levels from 1.4 through 5.4 p.s.i. at 0.6 sec. increments from 0.6 sec. to 5.4 sec., the film ruptured at each attempt rather than being stretched and oriented. Finally, a multi-layer sample having 3 mils of the same ethylene-propylene copolymer as used above applied to each side of the 12 mil core layer of the same ethylene-vinyl acetate/ethylene-butylene copolymer blend as the preferred embodiment and was subjected to the test procedure. At the 216° F. temperature level, oriented films from 0.3 mils in thickness at 7.4 p.s.i. to 1.50 mils in thickness at 3.4 p.s.i. were produced using rates of application from 0.6 to 5.4 sec. at 0.6 sec. steps. Significantly, a thin, oriented, multi-layer polyolefin shrink film can be produced at a highly desirable orientation temperature at which the component layers of the multi-layer film can not be oriented.

Films having very thin layers of an oriented propylene polymer are produced by the method of the present invention. For example, the multi-layer films produced are in the range of 0.5 to 1.5 mil and the auxiliary layer thickness are in the range from 0.05 mil to 0.40 mil.

EXAMPLES

In Table 1 which appears below the physical properties of seven structures according to the present invention are shown. In the Table the abbreviation "EP" is for ethylene-propylene copolymer; the abbreviation "EVA" is for ethylene vinyl acetate copolymer; "EB" is for ethylene-butylene copolymer; "MD" is for machine direction; "TD" is for transverse direction; and "M+T" is for machine+transverse. The optical tests of haze, gloss, and transmission were performed according to ASTM D1003, the tear proprogation according to ASTM D1938, and tear resistance according to ASTM D1004.

TABLE 1

| Example No.: | (1) | (2) | (3) | (4) | (5) |
|---|---|---|---|---|---|
| | $EP^1/EVA^2/EP^1$ | $EP^1/EVA^2/EP^1$ | 80% $EVA^3$ $EP^1$/20% $EB^4/EP^1$ | 80% $EVA^3$ $EP^5$/20% $EB^4/EP^5$ | 80% $EVA^3$ $EP^6$/20% $EB^{14}/EP^6$ |
| 3. Layer Ratio | 1/3.5/1 | 1/4/1 | 1/3/1 | 1/4/1 | 1/4/1 |
| Tensile X 100 (PSI) | | | | | |
| MD | 90 | 103 | 105 | 100 | 81 |
| TD | 30 | 98 | 103 | 106 | 83 |
| Elongation (%) | | | | | |
| MD | 82.9 | 82.2 | 97.4 | 68 | 85.6 |
| TD | 67.4 | 95.4 | 53.6 | 75.8 | 84.8 |
| 3. Modulus X 1000 (PSI) | | | | | |
| MD | 88 | 93 | 88 | 89 | 78 |
| TD | 99 | 89 | 110 | 88 | 95 |
| 9. Tear Propagation (gms) | | | | | |
| MD | 3.79 | 4.21 | 242.0 max | 24.25 | 18.25 |
| TD | 3.62 | 5.01 | 12.62 | 25.38 | 19.13 |
| 10. Tear Resistance lbs) | | | | | |
| MD | 0.46 | 0.72 | 0.49 | 0.50 | 0.61 |
| TD | 0.59 | 0.62 | 0.40 | 0.61 | 0.65 |
| 11. Ball Burst impact (cm-kg) | 6.4 | 9.6 | 6.2 | 8.6 | 7.0 |
| 12. Optics | | | | | |
| Haze (%) | 1.8 | 1.8 | 1.6 | .5 | 2.0 |
| Gloss (%) | 87 | 87 | 88 | 92 | 85 |
| 12. Total transmission (%) | 92.4 | 92.3 | 92.4 | 92.5 | 92.5 |
| 13 Shrink Tension Range (PSI) | | | | | |

TABLE 1-continued

| | | | | | |
|---|---|---|---|---|---|
| $\frac{M+T}{2}$ | 215–315 | 270–365 | 210–320 | 250–305 | 190–295 |

| | | Example No.: | (6) | (7) |
|---|---|---|---|---|
| | | | 80% EVA[3] EP[6]/20% EB[4]/EP[6] | 80% EVA[3] EP[6]/20% EB[7] |
| | 3. Layer Ratio | | 1/4/1 | 1/4/1 |
| | Tensile X | | | |
| | 100 (PSI) | | | |
| | MD | | 93 | 90 |
| | TD | | 90 | 86 |
| | Elongation (%) | | | |
| | MD | | 86.6 | 88.3 |
| | TD | | 92.4 | 107.6 |
| | 3. Modulus X | | | |
| | 1000 (PSI) | | | |
| | MD | | 87 | 84 |
| | TD | | 85 | 86 |
| | 9. Tear Propagation (gms) | | | |
| | MD | | 23.62 | 23.00 |
| | TD | | 28.88 | 30.25 |
| | 10. Tear Resistance lbs) | | | |
| | MD | | 0.53 | 0.74 |
| | TD | | 0.62 | 0.60 |
| | 11. Ball Burst impact (cm-kg) | | 8.8 | 7.6 |
| | 12. Optics | | | |
| | Haze (%) | | 2.2 | 2.8 |
| | Gloss (%) | | 87 | 86 |
| | 12. Total Transmission (%) | | 92.2 | 92.1 |
| | 13 Shrink Tension Range (PSI) | | | |
| | $\frac{M+I}{2}$ | | 205–290 | 210–290 |

1. Ethylene-propylene copolymer, "WO7-1" by ARCO Polymer, Inc. having 3.5% to 4.0% ethylene and a melt flow of about 4.0.
2. Ethylene-vinyl acetate copolymer, "Alathon 3137" by du Pont having 12% vinyl acetate and melt flow of about 0.5.
3. Ethylene-vinyl acetate copolymer, "Alathon 3135" by du Pont having 12% vinyl acetate and melt flow of about 0.25.
4. Ethylene-butylene copolymer, "Witron 8240-2," by Witco Chemical Corporation having a melt flow range of 1.0 to 2.0.
5. Ethylene-propylene copolymer, "A-122" ARCO Polymers, Inc. having 3.5% to 4.0% ethylene and a melt flow of about 1.0.
6. Ethylene-propylene copolymer, "EL Hexene 4433" by Rexene Polyolefin Co., Division of Dart Industries.
7. Ethylene-butylene copolymer, "Witron 8240-0" by Witco Chemical Corporation having a melt flow range of about 0.61.
8. ASTM D882
9. ASTM D1938
10. ASTM D1004
11. ASTM D3420
12. ASTM D1003
13. ASTM D2838
14. Same as 4 except designated "Witron 8240-4" having melt flow of about 3.7.

In Table II below further tests were conducted on multi-layer films of the present invention and PVC films to evaluate their performance under industrial packaging conditions. (Examples designated 1, 2, 3, and 4 in Table I are the same as Examples 8, 9, 12, and 13 respectively in Table II.) In the tests rolls of each film structure were prepared and sections of the film from each roll removed and evaluated for gloss, clarity, and amount of haze and tear resistance before shrink. Each roll was then placed on a model "W-2" packaging machine by the Shanklin Corporation and used to package a gift box as described hereinabove.

The packaged gift boxes were sent through a model "7141C" hot air shrink tunnel by Weldotron to shrink the film tightly against the boxes. Packages were run through the tunnel at 25° F. steps from 250° F. to 350° F. Film was removed manually from the packages to evaluate the ease of opening and resistance to tear. In Table II, the optical properties are a subjective composite of all the packages made with the film of that particular example. For most of the films the appearance of the film was of such high quality that the testing methods available could not make objective distinctions between the films.

As is to be expected, the tear resistance of all the materials improved after the material was shrunk and, in general, the structures (Ex. 11–18) with the ethylene-butylene copolymer blended into the core layer tended to have higher levels of tear resistance as compared to the unblended core structures (Ex. 7–10).

The trim sealability of the structures in Table II was evaluated by preparing packages and trim sealing them with an automatic "L-bar" sealer by Shanklin Corporation. The trim sealability was generally excellent for all coextruded structures with no noticeable buildup of material on the sealing wire and no sticking of the material to seals. Some "angel hair" did exist but it was not excessive. "Angel hair" is a very fine, thin thread-like portion of material that separates from the sealed area of the film in a trim-sealing operation. Excessive "angel hair" tends to clog the sealer, slow down the sealing operation, and detract from package appearance. In addition, it was found that films with an unblended EVA core layer required longer seal dwell times than the corresponding examples with a blended core layer. The strength of the seals on the Shanklin machine were consistently in the 3 to 5 lbs./linear inch range.

All the materials had acceptable packages in the shrink tunnel temperature range of 240° F. to 340° F. At temperatures above 340° F. the multi-ply materials tended to become hazy while the PVC did not. Also, the PVC films tended to have voids in the seal area while most of the multi-layer films according to the present invention did not.

TABLE II

| Example No | Construction | Ratio | Haze | Optical Gloss | Optical Clarity | Tear Resistance | Trim Sealability | Trim Sealability Voids in Seal Area |
|---|---|---|---|---|---|---|---|---|
| 8 | [P[1]/EVA[2]/EP[1] | 1/3.5/1 | None | Exc. | Exc. | Moderate | Excellent | + |
| 9 | " | 1/4/1[3] | None | Exc. | Exc. | Moderate | Adequate | + |
| 10 | " | 1/4/1 | Slight | Fair | Good | Poor | Excellent | + |
| 11 | " | 1/2/1 | None | Exc. | Exc. | Poor | Excellent | + |
| 12 | 80% EVA[5] EP[1]/20% EB[4]/EP[1] | 1/3/1 | Mod. | Poor | Poor | Poor | Excellent | + |
| 13 | " | 1/4/1[6] | None | Exc. | Good | Moderate | Adequate | + |
| 14 | " | 1/4/1[7] | None | Exc. | Exc. | Moderate | Excellent | None |
| 15 | " | 1/4/1[8] | None | Exc. | Good | Moderate | Excellent | None |
| 16 | " | 1/4/1[9] | None | Exc. | Good | Moderate | — | None |
| 17 | 80% EVA[5] EP[10]/20% EB[11]/EP[10] | 1/4/1 | None | Exc. | Exc. | Poor-Moderate | Excellent | None |
| 18 | " | 1/4/1[12] | None | Exc. | Exc. | Poor-Moderate | Excellent | None |
| 19 | " | 1/4/1 | None | Exc. | Exc. | Poor-Moderate | Excellent | None |
| 20 | PVC[14] | 1/4/1 | None | Exc. | Exc. | Moderate-Good | Excellent | + |

[1]Ethylene-Propylene Copolymer, "WO7-1" by ARCO Polymers, Inc. having 3.5% to 4.0% ethylene and melt flow of about 4.0.
[2]Ethylene-Vinyl Acetate, "Alathon 3137" by du Pont having 12% vinyl acetate content and melt flow of about 0.5.
[3]Irradiated by electrons to a dosage of approximately 6 MR.
[4]Ethylene-Butylene Copolymer, "Witron-8240-2" by Witco Chemical Corp. having about 2.0% Ethylene by weight and a melt flow from 1.0 to 2.0.
[5]Ethylene-Vinyl Acetate, "Alathon 3135" by du Pont having 12% vinyl acetate content and melt flow of about 0.25.
[6]Slip agents added to ethylene-propylene layer.
[7]Ethylene-Propylene Copolymer, "K-122"]by ARCO Polymers, Inc. having 3.5% to 4.0% ethylene and melt flow of about 1.0.
[8]1.5 times slip agent concentration of (6).
[9]3.5 times slip agent concentration of (6).
[10]Ethylene-propylene copolymer, "EL Rexene 44J3" by Rexene Polyolefin Co. Division of Dart Industries.
[11]Ethylene-butylene copolymer, "Witron 8240-4" by Witco Chemical Corp. having melt flow of about 3.7.
[12]Ethylene-Butylene Copolymer, "Witron-8240-2" by Witco Chemical Corp. having about 2.0% ethylene by weight and a melt flow of from 1.0 to 2.0.
[13]Ethylene-Butylene Copolymer, "Witron 8240-0" by Witco Chemical Corp. having melt flow index of about 0.61.
[14]"Reynolon 4155" by Reynolds Metals Corporation.

EXAMPLE 21

A multi-layer film having a core layer as in Example 12 above was prepared with skin or auxiliary layers comprising "Dypro 7649-93," an ethylene-propylene copolymer from ARCO Polymes, Inc. having a melt flow of 2.3 and an ethylene content in the range of 3.5% to 4.0% by weight. This film was cross-linked by irradiating it with electrons to a dosage level of about 2.0 MR and then oriented by stretching it in both the longitudinal (machine) and transverse directions. This material had haze of 1.2%, gloss of 86%, and transmission of 92.4% as determined by the methods used in Table I. Because of the cross-linking the film was somewhat more difficult to seal but had higher tear resistance than the film of Example 12. In irradiating the multi-layer film of the present invention, it is believed that the major portion of the cross-linking occurs between ethylene molecules and that the core layer would, therefore, be most affected by irradiation.

In Table III below examples 22 to 25 are shown in which the blend ratio of the core material is varied. The EVA copolymer is the "Alathon 3135" brand having 12% vinyl acetate, the EB copolymer is the "Witron 8240-2" band and the EP copolymer is the "Dypro 7649-93" brand, each of these brands being described hereinabove.

TABLE III

| Example No. | 22 | 23 | 24 | 25 |
|---|---|---|---|---|
| Core Layer | 70% EVA 30% EB | 80% EVA 20% EB | 85% EVA 15% EB | 90% EVA 10% EB |
| Skin Layer | EP | EP | EP | EP |
| Layer Ratio | 1/4/1 | 1/4/1 | 1/4/1 | 1/4/1 |
| Tear Propagation Resistance (gms.) | | | | |
| MD | 33.25 | 50.38 | 13.25 | 19.50 |
| TD | 46.75 | 60.38 | 27.75 | 24.88 |
| Tear Resistance (lbs.) | | | | |
| MD | 0.54 | 0.54 | 0.90 | 0.36 |
| TD | 0.66 | 0.48 | 0.82 | 0.51 |
| Optics | | | | |
| Haze (%) | 1.2 | 1.3 | 1.2 | 1.2 |
| Gloss (%) | 93 | 91 | 92 | 99 |
| Shrink Tension Range (PSI) | | | | |
| MD + TD/2 | 220–275 | 225–325 | 240–305 | 205–285 |

The films having a 80/20 core blend have the best combination of optical properties, machinability, tear propogation resistance and sealability while the films having the 70/30 core blend have lower seal strength, good to excellent optics and good tear propagation resistance. The tear propagation resistance of the films having 85/15 core blend and of the films having the 90/10 core blend was not as good but these films have excellent seal strength and optics.

For some applications it is desirable to blend one or both components of the core composition into the auxiliary or skin layer composition to promote even greater melt joining of the layers, and, to some extent, further moderate the characteristics of the predominately propylene auxiliary layer. The desirable range for this blend is 0.1 to about 15% by weight of one or more of the core constituents in the propylene homopolymer or copolymer of the auxiliary layer.

In some instances it will be desirable to substitute polyethylene for the ethylene vinyl acetate copolymer of the core blend and use a higher proportion of polybutylene or ethylene-butylene copolymer. In other instances it will be desirable to use a higher vinyl acetate content EVA with a higher melt flow, e.g., greater than 1.0, with a smaller proportion of the butylene polymer. In general, the homopolymers and copolymers of ethylene preferred in the core blend of the present invention include polyethylene, ethylene-vinyl acetate copolymer, and ethylene-propylene copolymer while the homopolymers and copolymers of butylene include polybutylene and ethylene-butylene copolymer. The homopolymers and copolymers of propylene for the auxiliary layer include polypropylene and ethylene-propylene copolymer.

An additional feature or aspect of my invention is the inclusion of additional polymeric layers so that a structure of 5, 7, 9, or more layers is the result. Layers of polymers such as ionomers, polyesters, and polycarbonates may be used to impart improved hot seal characteristics to the basic three layer film laminate. A material is said to have adequate "hot seal strength" if it has sufficient cohesive and adhesive strength at heat sealing temperatures to prevent bond failure under the stress applied to the seal while it is still hot. Also, layers of polymers such as vinyl chloride-vinylidene chloride copolymer (saran) and hydrolyzed ethylene-vinyl acetate copolymer may be used if low gas permeability is desired.

EXAMPLE 26

Based on work done and experience with the multi-layer films a five layer film can be prepared with the following preferred thickness ratio for the layers: 1/2/1/2/1. The outer or skin layers are the ethylene-propylene copolymer of the preferred embodiment above. The central layer is "Suryln" brand ionomer sold by duPont. Ionomers are, of course, polymers having ethylene as a major component but with both covalent and ionic bonds. The remaining two layers are the preferred core composition according to the present invention. In other words, this multi-layer film structure is the same as the preferred three layer structures described above except that the central or core layer has been divided in half and a layer of ionomer interposed therebetween. This structure will retain the desirable shrinkage properties of the preferred three layer laminate and will, in addition, have added "hot seal strength" due to the ionomer layer.

EXAMPLE 27

The same structure as described in Example 26 is used except that the central layer is a polyester, preferably polyethylene terephthalate, rather than an ionomer. Again, the desirable shrink properties of the three layer film are retained plus the "hot seal strength" is improved.

EXAMPLE 28

The same structure as described in Example 26 is used except that the central layer is formed from a polycarbonate resin. The shrink properties of the preferred embodiment plus the "hot seal strength" are available in this laminate.

Other multi-layer structures can be made within the scope of my invention by including special purpose polymeric layers with the basic core and auxiliary layers described above.

Having thus described my invention,

1. A process for making a multi-layer, flexible, thermoplastic packaging film comprising the steps of:
    (a) blending 70% to 90% by weight of polymer selected from the group consisting of homopolymers and copolymers of ethylene with 30% to 10% by weight of a polymer selected from the group consisting of butylene homopolymers and copolymers to form a core blend;
    (b) providing an auxiliary composition comprising a polymer selected from the group consisting of propylene homopolymers and copolymers;
    (c) coextruding a layer of said core blend between two layers of said auxiliary composition to form a multi-layer film, said core layer being 1 to 8 times the thickness of said auxiliary layers; and,
    (d) stretching said multi-layer film to orient same.

2. The process of claim 1 wherein the major portion of said core layer blend is ethylene-vinyl acetate copolymer having a melt flow of less than 5.0 and said minor portion is ethylene-butylene copolymer.

3. The process of claim 1 wherein said auxiliary layer comprises ethylene-propylene copolymer.

4. The process of claim 1 including between steps (c) and (d) the steps of cooling said film and then reheating same to its orientation temperature.

5. The process of claim 4 wherein said multi-layer film is coextruded as a tube and said stretching and orientation is accomplished by inflating said tubing by the trapped bubble technique to biaxially orient same.

* * * * *